(12) United States Patent
Marceau

(10) Patent No.: US 9,227,333 B2
(45) Date of Patent: Jan. 5, 2016

(54) SLICING APPARATUS AND METHOD OF USE THEREOF

(71) Applicant: Quin Marceau, Benicia, CA (US)

(72) Inventor: Quin Marceau, Benicia, CA (US)

( * ) Notice: Subject to any disclaimer, the term of this patent is extended or adjusted under 35 U.S.C. 154(b) by 224 days.

(21) Appl. No.: 13/914,391

(22) Filed: Jun. 10, 2013

(65) Prior Publication Data

US 2014/0360022 A1  Dec. 11, 2014

(51) Int. Cl.
*B26B 27/00* (2006.01)
*A21D 15/04* (2006.01)
*A21C 15/04* (2006.01)

(52) U.S. Cl.
CPC ............. *B26B 27/002* (2013.01); *A21C 15/04* (2013.01)

(58) Field of Classification Search
CPC ............................... B26B 27/002; A21C 15/04
USPC ..................................................... 30/114–117
See application file for complete search history.

(56) References Cited

U.S. PATENT DOCUMENTS

| | | | | |
|---|---|---|---|---|
| 818,528 | A * | 4/1906 | Drummond | 83/733 |
| 2,085,372 | A * | 6/1937 | Lenk | 30/114 |
| 2,504,756 | A * | 4/1950 | Tenborg | 30/114 |
| 2,759,261 | A * | 8/1956 | Setecka | 30/116 |
| 3,132,678 | A * | 5/1964 | Steketee | 83/765 |
| 4,398,347 | A * | 8/1983 | Duffy | 30/90.1 |
| 4,425,706 | A | 1/1984 | Southworth et al. | |
| 4,672,873 | A * | 6/1987 | Kinser | 83/200.1 |
| 2010/0199500 | A1* | 8/2010 | Baeten et al. | 30/116 |
| 2011/0030222 | A1* | 2/2011 | Chen et al. | 30/114 |
| 2014/0068949 | A1* | 3/2014 | Newman et al. | 30/114 |
| 2014/0360022 | A1* | 12/2014 | Marceau | 30/114 |

FOREIGN PATENT DOCUMENTS

WO         8704383 A1     7/1987

* cited by examiner

*Primary Examiner* — Hwei C Payer
(74) *Attorney, Agent, or Firm* — Gordon Rees Scully Mansukhani LLP

(57) ABSTRACT

A slicing apparatus comprises a housing and at least one filament with a first and second end. The at least one filament is pullable by a user. The housing is defined by perimeter walls and has a bottom with an opening, a top, and a vertical member. The vertical member has a longitudinal axis and extends from the top of the housing towards the bottom. The at least one filament mechanically connects to the vertical member and the remainder of it passes through the perimeter walls. Once passed through, the second end of the at least one filament terminates external to the housing. With the second end of the at least one filament now external to the housing, the user can move the at least one filament. When the at least one filament is moved by a user, the at least one filament may effect slices into a volume of matter.

4 Claims, 11 Drawing Sheets

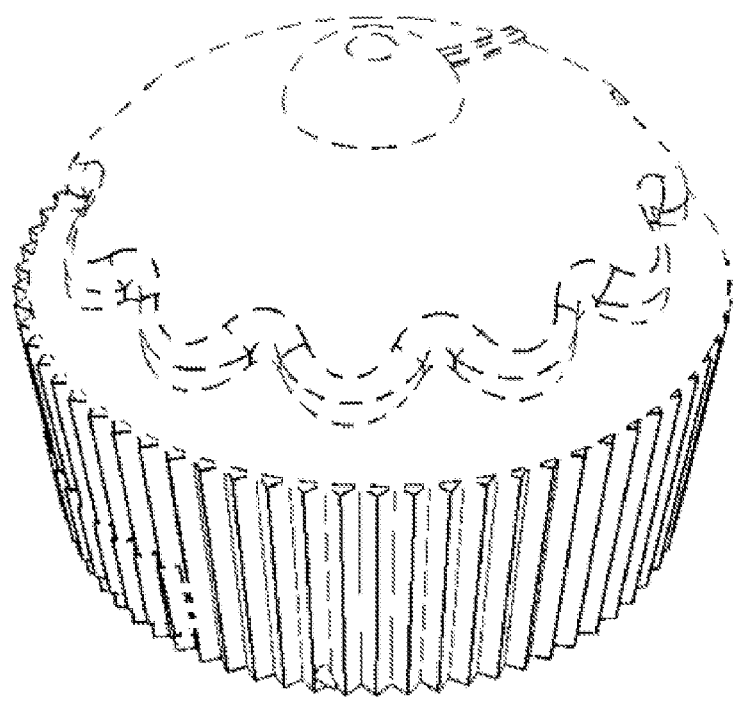
FIG 14. : ISOMETRIC TOP WITH HATCHED ICING
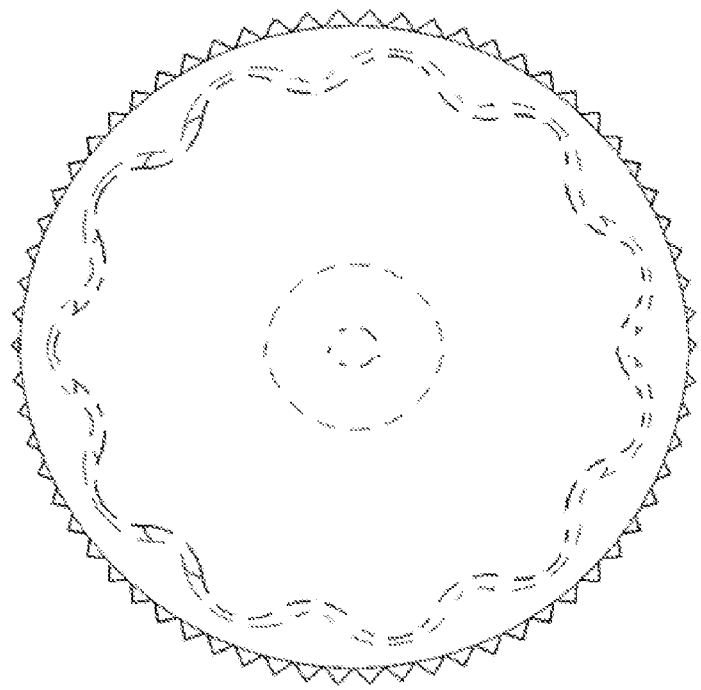
FIG. 15: TOP WITH HATCHED ICING

SLICING APPARATUS AND METHOD OF USE THEREOF

FIELD

The embodiments disclosed herein relate generally to slicing apparatuses, and in particular to slicing apparatuses with at least one filament for slicing food or other volumes of matter.

BACKGROUND

One problem with conventional slicing means is that they can be unsafe. Whether slicing bread, cake, cheese or any other volume of matter, traditional knives or other cutting implements fall short because their use requires that the user be both careful and skilled. One slight mistake with the knife can leave the user injured. Accordingly, a need exists for a device that allows users to slice these sorts of foods without fear of injury and with little experience.

A related problem is that conventional slicing means produce uneven cuts. Similar to safety, one slight mistake leaves a user with an uneven slice or layer. This is problematic for the presentation as well as the functionality of the food. For instance, if a user is baking a layer cake that requires some sort of filling, when the user slices the cake to create the layers, one uneven horizontal slice can ruin the entire cake. If bad enough, this can force a user to start the layer cake from scratch which leads to substantial wastes of time and resources.

In commercial settings, it is typical for users to create layer cakes by using large knives. Using this technique, a user takes a frozen cake and uses a large knife to slice the frozen cake to create horizontal slices (i.e. layers). However, this is problematic for several reasons. First, it requires much more time to bake a cake and then freeze it to the extent necessary to slice layers using this method. Second, when using large knives of any kind, let alone slicing frozen blocks of cake, a user must be certain to employ a fairly high standard of care in order to avoid injuries. Additionally, a certain amount of skill and strength is involved in slicing frozen cake. This places much stress and responsibility on the user. Accordingly, a safer method and device is necessary to ensure commercial kitchens cease wasting time baking and freezing cakes as well as avoiding further unnecessary injuries in the workplace.

As for presentation, where certain foods require multiple layers, there is a need to ensure that multiple layers are easily achievable. In the modern age of ubiquitous consumer restaurant reviews, favorable ratings can spell the difference as to whether a restaurant survives, meaning that presentations leading to higher ratings are of the utmost concern to restaurants. As to layer cakes, a user must slice the cake into precise, uniform, and often thin layers. Because issues are often encountered when slicing thin, fragile food volumes even by skilled users, there is a need for a slicing apparatus that allows a user to produce foods such as a presentable layer cake, irrespective of skill or experience.

Elaborate and large machines have been designed to effect uniform slices as described above. However, these machines lack mobility and can be prohibitively expensive. Furthermore, these machines typically only slice in one direction (i.e. sliced bread). Accordingly, a need exists for a device that is relatively inexpensive, mobile, and has the ability to slice in more than one direction.

A related problem is that conventional slicing means are difficult to use for horizontal slices, vertical slices, and some combination thereof. Humans have consistently searched for a unique device that provides the ability to slice food or other volumes horizontally and vertically, with the same tool and the same slicing movement. For example, in the context of presentation, users often need to create cakes or other types of food with intricate shapes that are not uniformly horizontal or vertical but instead some combination thereof. Normally, if a user requires slices in multiple directions and planes, using a slicing machine is onerous due to time costs in setting up each slice. With a knife, all of the safety and care issues described above become a concern. Accordingly, a need exists for a device that provides users with the ability to effect slices in multiple directions and planes without having to waste time rearranging machinery or carefully moving a knife between slices.

Another related problem is sanitation. Whether using a knife or a cutting filament such as a cheese slicer, once a user has sliced one type of food (e.g. cheese), the user must then clean the cutting means in order to proceed to another medium. If at that time the user is not situated near a water source, soap, or other cleaning means, this can present an unnecessary obstacle in terms of time and energy costs before the user may proceed with slicing.

As society has become increasingly mobile, an emphasis on compact, mobile goods has become important with most products. Knives large enough to slice horizontal layers are impractical to easily carry around on one's person. The same issue to larger degree applies to slicing machines. Devices that employ cutting filaments (such as a wire cheese slicer) fall short in terms of mobility since they are incapable of fitting into a single storable mobile container. Accordingly, a need exists to provide a highly mobile and compact slicing apparatus.

To solve the various problems outlined above, many solutions have been proposed. For example, certain devices have been disclosed that include a blade and a single filament in order to slice a granular cake. These devices contain a cutter that adjustably fixes to abuse assembly for use on a flat surface. These devices use a cutting filament that is embedded in the sliceable matter to encircle the sliceable material after a cut has been made (see for example, PCT/AU87/00009). While this device is known, it has its drawbacks. First, if the user does not maintain complete control over the cake during cutting, the cake is cut unevenly or not at all if the cake moves. Second, the method of cutting involves several steps that place considerable responsibility on the user. In order to cut, the user must first form a marginal cut with the blade and then, insert the filament into the cut. Moreover, a user must use a locking screw to fix the vertical height before she can slice horizontal layers. In essence, there are three separate steps the user must get right before she can simply move the filament through a slice. Finally, the device requires the use of both a filament and a blade to effect slices.

Accordingly, a need exists for a device that can slice in one single step and more specifically, a device without much setup where the user can focus on simply maneuvering the filament for slices in the direction and plane the user desires. Further, a need exists for a device that allows a user to slice along multiple planes without having to utilize a locking mechanism. Finally, a need exists for a device that allows a user to slice in both the vertical and horizontal planes with only at least one single filament instead of additional cutting parts such as a serrated blade.

Another significant problem with other filament cutters is that typically the filament is spaced a fixed distance, meaning, span that the filament can cut is not easily adjustable, either horizontally or vertically (See U.S. Pat. No. 4,425,706). Essentially, the device contains one filament that can be drawn through a cake to insert a slice. However, vertical slices are not easily achievable and require a user to complete the horizontal slice before moving onto slices in a different plane. Further spacing between the filament and the member(s) to which it is affixed place a limit on the depth of the slice. For instance, the device disclosed in U.S. Pat. No. 4,425,706 suffers from this limitation and consequently can only cut rectangular sections of limited depths.

Another significant problem with other devices that have used cutting filaments is with the sleeves that are intended to be used in tandem. In this approach, the cake is placed internal to the sleeve and the filament is attached at a guide fixed at a vertical position. To effect horizontal layers, the user moves the filament through the cake thereby providing a horizontal slice since the guide restricts the filament for going beneath that particular horizontal plane. This concept is limited to providing only horizontal slices as opposed to being able to slice horizontally, vertically, or some combination thereof. Further, the type of matter that can be sliced is dependent upon the form factor of the sleeve (i.e. it must fit within the given envelope). It should be noted that the shape of the sleeve is not easily adjustable.

Accordingly, it would be advantageous for an apparatus that can precisely slice multiple-shaped sections depending on the geometry of the volume and the user's needs. It would also be advantageous to provide an apparatus that allows a user to slice layers or sections irrespective of spacing constraints so that a user without experience or fear of injury can precisely and efficiently slice many different sized volumes. Moreover, there is a need for an apparatus that removes the need for use of any blades or is not dependent upon the pre-set tension of a filament. Finally, it would be advantageous to provide a slicer with a high degree of mobility that satisfies the foregoing needs and can be made relatively inexpensively.

SUMMARY

The slicing apparatus disclosed below satisfies these needs. The following presents a simplified summary in order to provide a basic understanding of some aspects of the claimed subject matter. This summary is not an extensive overview, and is not intended to identify key/critical elements or to delineate the scope of the claimed subjected matter. Its purpose is to present some concepts in a simplified form as a prelude to the more detailed description that is presented later.

In one embodiment, the slicing apparatus comprises a housing and at least one filament with a first and second end. The at least one filament is configured to be pulled by a user. The housing is defined by perimeter walls and has a bottom with an opening, a top, and a vertical member. The vertical member has a longitudinal axis and extends from the top of the housing towards the bottom. The at least one filament mechanically connects to the vertical member and the remainder of it passes through the perimeter walls of the housing. This allows the second end of the at least one filament to terminate external to the housing in order to be pulled and/or moved. With the second end of the at least one filament now external to the housing, the at least one filament can rotate and/or move with respect to the longitudinal axis of the vertical member. In certain embodiments, the housing may be bored out.

In another embodiment, the housing of the slicing apparatus may also include an upper alignment aperture. The upper alignment aperture is disposed on the bottom of the housing. In this embodiment, the slicing apparatus may also include a button and a bottom cover. The button can include a filament edge, a hinge edge, an upper alignment member, and a lower alignment member. The upper alignment member is designed so that it mates with the upper alignment aperture of the housing to provide a degree of alignment between the housing and the button. The bottom cover in this embodiment is designed to close the opening in the bottom of the housing. Additionally, the bottom cover comprises a lower alignment aperture such that the lower alignment member of the button can mate with the lower alignment aperture of the bottom cover. This provides a degree of alignment between the housing, the button, and the bottom cover. In this embodiment, the second end of the at least one filament can pass between the perimeter walls of the housing and the filament edge of the button en route to terminating external to the housing.

In another embodiment, the slicing apparatus may also include a release mechanism. The release mechanism can include potential energy stored therein so that no energy need be later included to engage it. In this embodiment, the release mechanism is mechanically connected to the vertical member and disposed internal to the housing. The release mechanism functions in such a way that the potential energy stored therein causes the at least one filament to be pulled towards the vertical member. This force also provides a resistance force when the user pulls the at least one filament away from the vertical member.

In another embodiment, a cleaning mechanism comprised of a plurality of one-way seals disposed on the perimeter walls of the housing may also be included to address sanitation needs. Consequently, when the release mechanism pulls the at least one filament, the at least one filament passes through the plurality of seals that are situated on the perimeter walls of the housing. When the at least one filament passes through the plurality of seals, this causes undesirable residual matter that adhered during slicing (e.g. icing, cake, crumbs, or other particles of matter) to collect in the plurality of seals thereby being removed from the at least one filament.

In another embodiment, the slicing apparatus comprises a spring element which can include a spring and a spring housing. Situated inside the housing, the spring element is designed to contain potential energy once the spring element is assembled in the housing. In this embodiment, the assembled spring element mechanically connects to the vertical member. Consequently, when the second end of the at least one filament is pulled away from the housing, the potential energy stored internal to the spring element provides a resistance force that draws the at least one filament towards the vertical member.

In another embodiment, the slicing apparatus may further include a housing seal and a button seal. The housing seal is situated adjacent to the filament edge of the button. The button seal is disposed on the button and is adjacent to the housing seal. In between the housing seal and the button seal exists a gap through which the at least one filament can pass to terminate external to the housing in order to be pulled. When the spring element draws the at least one filament into the housing, the at least one filament passes through the gap between the housing and the button seal. This causes residual matter that may have adhered to the at least one filament while external to the housing during slicing to be removed by the housing and button seals.

In another embodiment, the slicing apparatus may additionally be configured so that the second end of the at least one filament is thicker than the rest of the at least one filament. This ensures that second end of the at least one filament is too thick to pass between the filament edge of the button and the perimeter walls of the housing. Meaning, when the spring element causes the at least one filament to be drawn into the housing, the second end of the at least one filament will stop when it meets the perimeter walls and the filament edge.

The matter which the slicing apparatus is configured to cut may range between food items such as baked goods including cupcakes, layer cakes and cakes of all shapes and sizes. It may also include bread, vegetables, and fruits. It is also contemplated that slicing apparatus could be used to effect slices in other non-consumable volumes of matter including foam for purposes of creating composite molds or structures. It is also contemplated that the slicing apparatus could be used to replace conventional cutting tools in regards to slicing polyurethane layers.

To the accomplishment of the foregoing and related ends, certain illustrative aspects are described herein in connection with the following description and the appended drawings. These aspects are indicative, however, of but a few of the various ways in which the principles of the claimed subject matter may be employed and the subject matter is intended to include all such aspects and their equivalents. Other advantages and novel features may become apparent from the following detailed description when considered in conjunction with the drawings.

BRIEF DESCRIPTION OF THE DRAWINGS

FIG. 14 is a perspective view of the slicing apparatus with hatched lines disclaiming the non-functional features depicted therein.

FIG. 15 is a top plan view of the slicing apparatus with hatched lines similarly disclaiming non-functional features depicted therein.

DETAILED DESCRIPTION

The embodiments disclosed below address the need for a relatively inexpensive, mobile, and potentially compact slicing apparatus that allow unskilled and skilled users to safely insert precise, efficient, slices in multiple planes irrespective of the volume of matter's form factor while also maintaining the ability to clean the slicing apparatus without access to external cleaning means. In one embodiment, the slicing apparatus comprises a housing and at least one filament with a first and second end. The at least one filament is configured to be pulled by a user. The housing is defined by perimeter walls and has a bottom with an opening, a top, and a vertical member. The vertical member has a longitudinal axis and extends from the top of the housing towards the bottom. The at least one filament mechanically connects to the vertical member and the remainder of it passes through the perimeter walls of the housing. This allows the second end of the at least one filament to terminate outside the perimeter walls in order to be pulled or moved. With the second end of the at least one filament now external to the housing, the at least one filament can move in multiple directions or rotate with respect to the longitudinal axis of the vertical member. In certain embodiments, the housing may be bored out. When the at least one filament is rotated due to the force of a user, it may be used to effect slices into a volume of matter such as cake.

Figure 1:
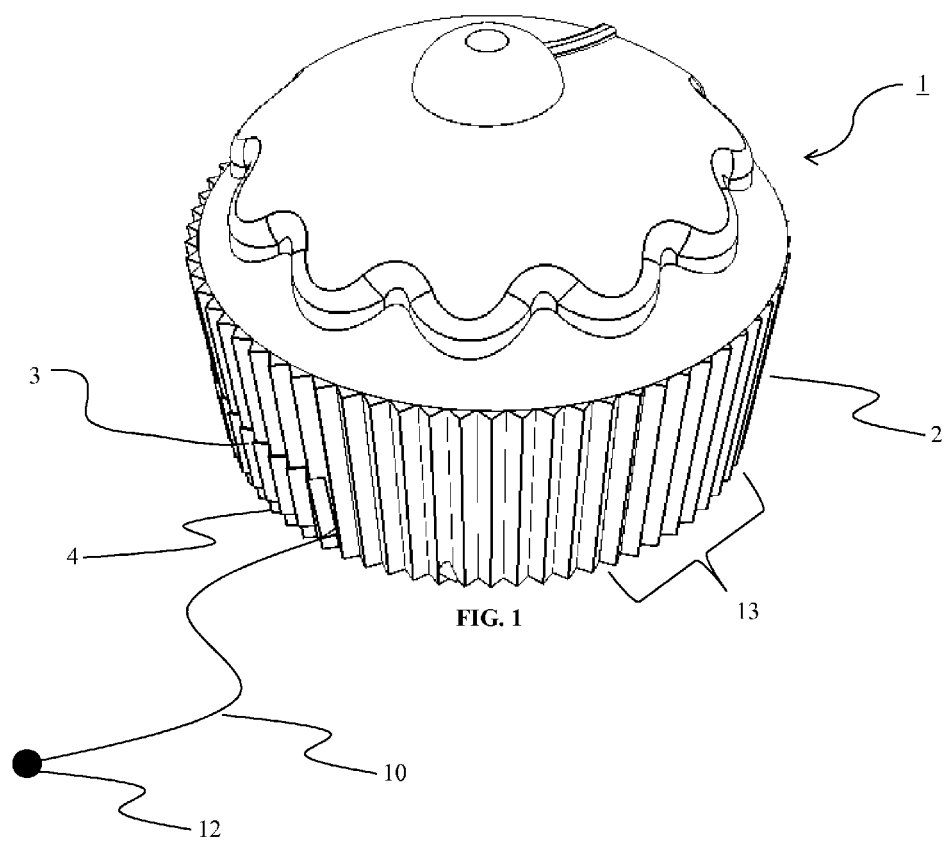
FIG. 1 is an upper perspective view of a slicing apparatus.

FIG. 1 is an upper perspective view of one embodiment of a slicing apparatus 1. Slicing apparatus 1 is shown including a housing 2 and a button 3. In FIG. 1, slicing apparatus 1 is depicted in the form of a cupcake but slicing apparatus 1 can be in other shapes and sizes according to user preference and design need since the aesthetic shape of the of housing 2 does not necessarily affect the general concept described herein.

Figure 2:
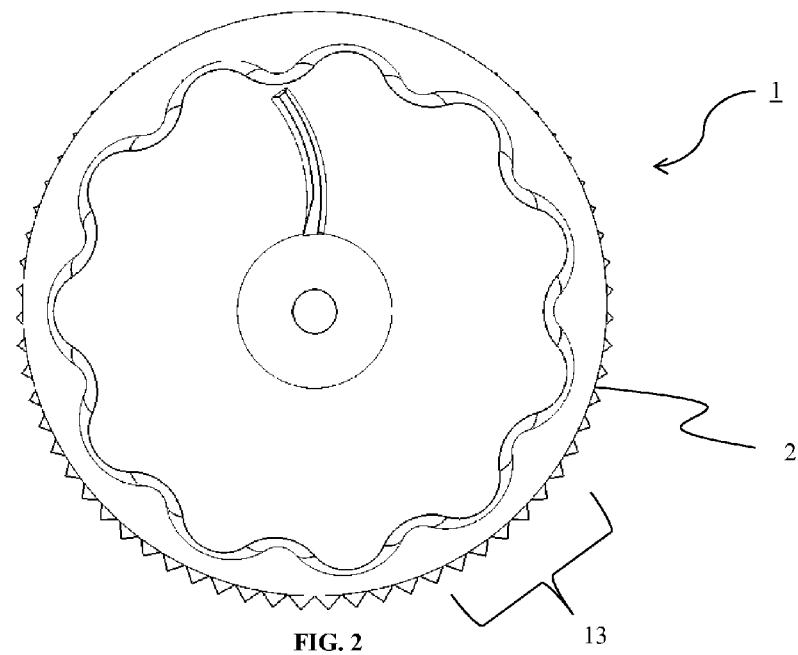
FIG. 2 is a top plan view of the slicing apparatus.

FIG. 2 is a top plan view of the slicing apparatus 1 further demonstrating certain aesthetic qualities of the housing 2 including the icing that is depicted above the housing 2.

Figure 3:
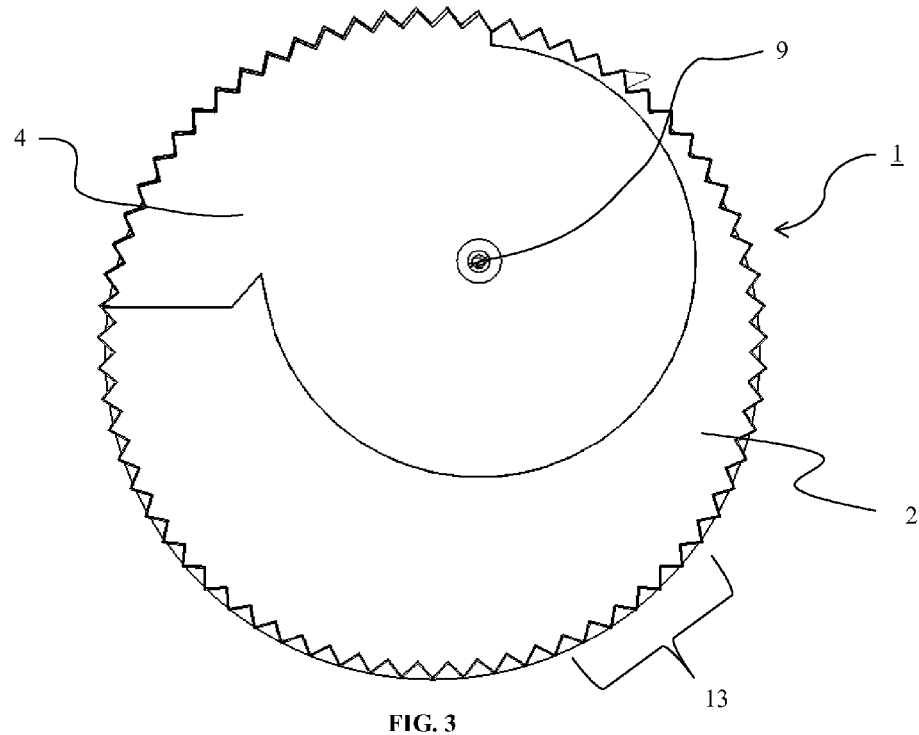
FIG. 3 is a bottom plan view of the slicing apparatus with a bottom cover.

In FIG. 3, the slicing apparatus 1 is shown from the bottom but with the bottom cover 4. In this embodiment, the bottom cover 4 serves to close the opening in the bottom of the housing 2. The bottom cover 4 in this embodiment is shaped to conform to the button 3 as it fits with the housing 2. However, if the housing 4 and/or the button 3 were of different shapes including for example sharper, rectangular, or polygonal form factors, then the shape of the bottom cover 4 would be shaped accordingly. In this embodiment, the vertical member 9 is also shown fitting to the bottom cover 4. The way that the vertical member 9 fits with the bottom cover 4 will be described in more detail below.

Figure 4:
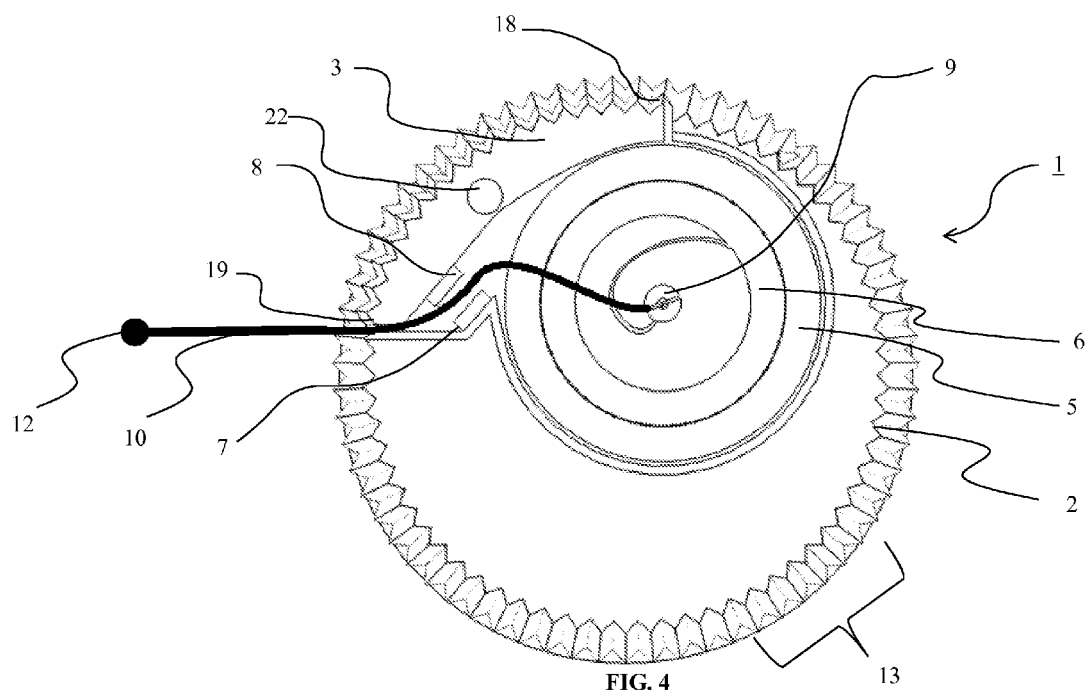
FIG. 4 is a bottom plan view of the slicing apparatus without a bottom cover and with at least one cutting filament.

For purposes of demonstration, when the bottom cover 4 is removed from the slicing apparatus 1 as shown in FIG. 4, it can be seen how the at least one cutting filament 10 functions with the housing 2 and the slicer apparatus 1 in general. In this embodiment, a spring housing 5 internal to the housing 2 can be seen. The spring housing 5 is depicted as being situated along the bottom 14 of the housing 2 on the upper surface of the bottom cover 4 (not depicted in FIG. 4). Internal to the spring housing 5 is a spring 6. Together, the spring housing 5 and spring 6 form the spring element 30. The spring 6 is equipped with potential energy which can be used to both provide resistance to the at least one filament 10 and provide forces that cause the at least one filament 10 to be drawn into the housing 2. It can be seen that the potential energy stored internal to the spring 6 is transferred to the vertical member 9 which in turn is transferred to the at least one filament 10. Thus, when a user pulls the at least one filament 10 away from the vertical member 9, the potential energy of the spring 6 is released thereby providing resistance. If the user lets go of the at least single filament 10, it will be pulled towards the housing and stop when the second end 12 of the at least one filament 10 is between the filament edge 19 of the button 3 and perimeter walls 13. However, once external to the housing 2, since the at least one filament 10 is not restricted in terms of mobility, it can be understood that the user can move the at least one filament in any desirable direction to effect a slice in the sliceable matter without regard for injury or any additional steps.

It can be seen in FIG. 4 that the second end 12 of the at least one filament 10 is thicker than the rest of the at least one filament 10 to the extent that when the at least one filament 10 passes between the filament edge 19 and the perimeter walls 13 of the housing 2, this increased thickness causes the second end 12 to stop the at least one filament 10 from being pulled into the housing 2 any further. The remainder of the at least one filament 10 that is now stored internal to the housing 2 is now ready to be moved to a different location (i.e. highly mobile) or the user can pull the at least one filament 10 again and proceed with slicing.

The spring housing 5 may be constructed from any relatively rigid material including plastic or metal. The spring 6 may be constructed from any typical coil including copper, steel, plastics, or any composite material. The spring element can be any equivalent that can fit within the housing 2's available envelope and provide similar resistance and resistance forces to the vertical member 9 and thus that at least one single filament 10. For example, the spring could be a tension spring or a compression spring. Alternatively, a coil spring could be replaced with an elastic band with potential energy stored therein that could fit internal to the spring housing 5 (or the elastic band housing 5 as it were). The elastic band would mechanically connect to the vertical member 9 to the extent that its resistance forces would similarly be transferred through the vertical member 9 to the at least one filament 10.

In another embodiment, the spring element 30 could be replaced with a sprocket or equivalent that would rotably attach to a crank arm and the vertical column 9. The crank arm could be disposed external to the housing 2 in order to provide a user the ability to retract the at least one filament 10 into the housing 2

Returning to FIG. 4, it can further be seen that the at least first filament 10 passes between the housing cleaning seal 7 and the button cleaning seal 8 which in this embodiment are adjacent to the filament edge 19. However, the seals (7,8) may be situated at any location where a small gap (18) would be provided such that when the at least one filament 10 passes through, matter is removed by the plurality of seals (7,8). In alternative embodiments, the seals (7,8) could be located elsewhere in accordance with the above description. There could also be more than two seals depending on the type of matter that is being sliced or how the relative tendency for certain matter to adhere to the at least one filament 10.

Furthermore, though not depicted, more than one filament could be used with the slicing apparatus according to user preference and design need. Additional cutting filaments would still mechanically connect to the vertical member 9. The force provided by the spring element to the vertical member 9 could be redesigned as per each additional filament that was added to the apparatus to account for the additional pulling forces.

Further, the method by which the housing and button cleaning seals 7,8 remove matter from the at least one filament could be replaced with alternative cleaning techniques. For example, a one-way valve could be situated near the filament edge or where the housing and button cleaning seals 7,8 are presently disposed in the attached figures. The one-way valve would be designed so that the filament 10 could pass through it traveling inwards or outwards with respect to the housing 2. However, as the filament 10 passed inwards towards the housing 2, the one-way valve would collect undesirable adhered matter. Further, this one-way cleaning valve could be detachable so that once finished with slicing and then cleaning, a user could easily release the one-way cleaning valve from the housing 2 and administer additional cleaning as required.

The lower alignment member 22 in FIG. 4 is situated on the lower side of the button 3. Though not depicted, this alignment member 22 is configured to fit into the lower alignment aperture on the bottom cover. How the lower alignment member 22 is shaped and how it fits with the lower alignment aperture is merely a general concept of aligning and mating the button 3 to the bottom cover 4. In alternative embodiments, the button 3 could mate to the bottom cover 4 through a click and lock device. The attachment could also be made by implanting magnets in each component so that the housing, bottom cover and the button tend to attract to each other at the respective attachment points.

Figure 5:
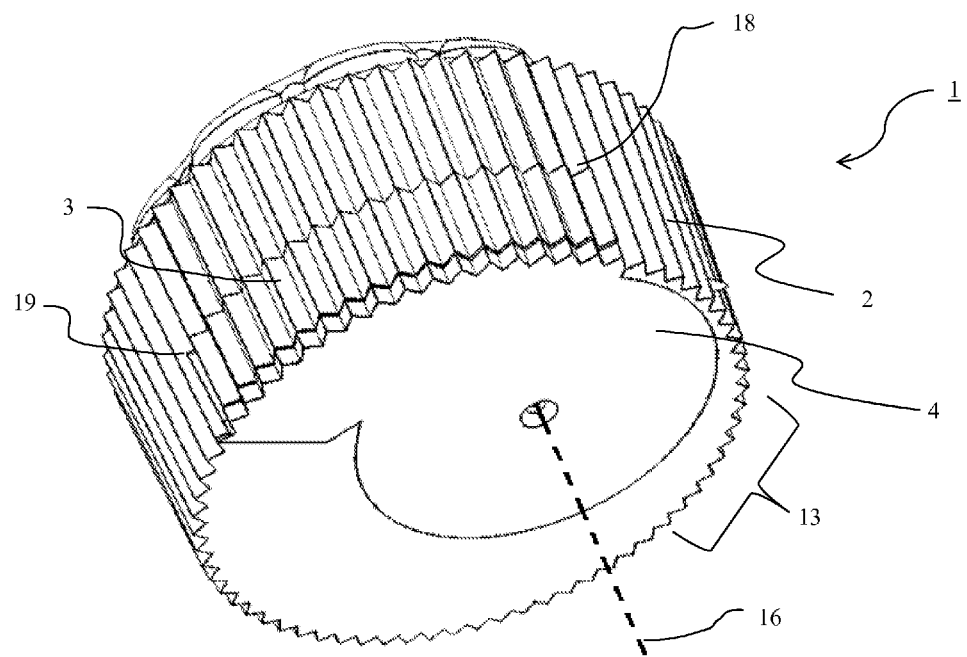
FIG. 5 is a lower perspective view of the slicing apparatus demonstrating the longitudinal axis of the vertical member and the assembly of the bottom cover and the button.

FIG. 5 is a lower perspective view of the slicing apparatus demonstrating the longitudinal axis of the vertical member. This view is particularly important since it depicts how the bottom cover 4 fits into the opening at the bottom 14 of the housing 2. Because the form factor of the housing 2 may change depending on design preference or needs, the shape of the bottom cover 4 is also subject to change.

Figure 6:
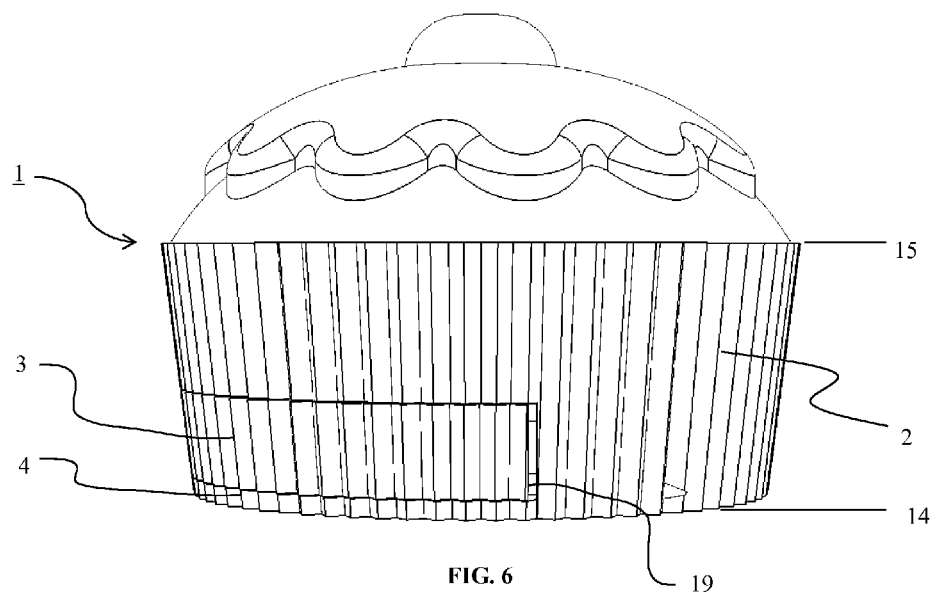
FIG. 6 is a front plan view of the slicing apparatus showing the button and the bottom cover attached to the housing.

Similarly, FIG. 6 shows the front pan view of one embodiment of the slicing apparatus. In this embodiment, the housing 2 has a top 15 and a bottom 14 with an opening (though the opening is not depicted in this view). Similar to FIG. 5, the button 3 is shown mated to the housing 2 atop the bottom cover 4.

Figure 7:
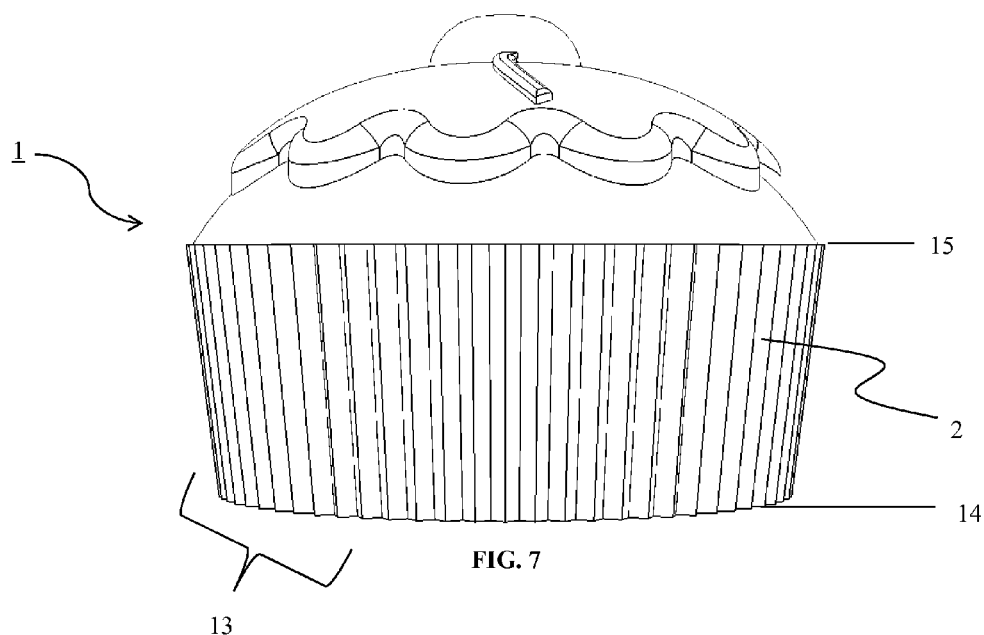
FIG. 7 is a back plan view of the slicing apparatus.
Figure 8:
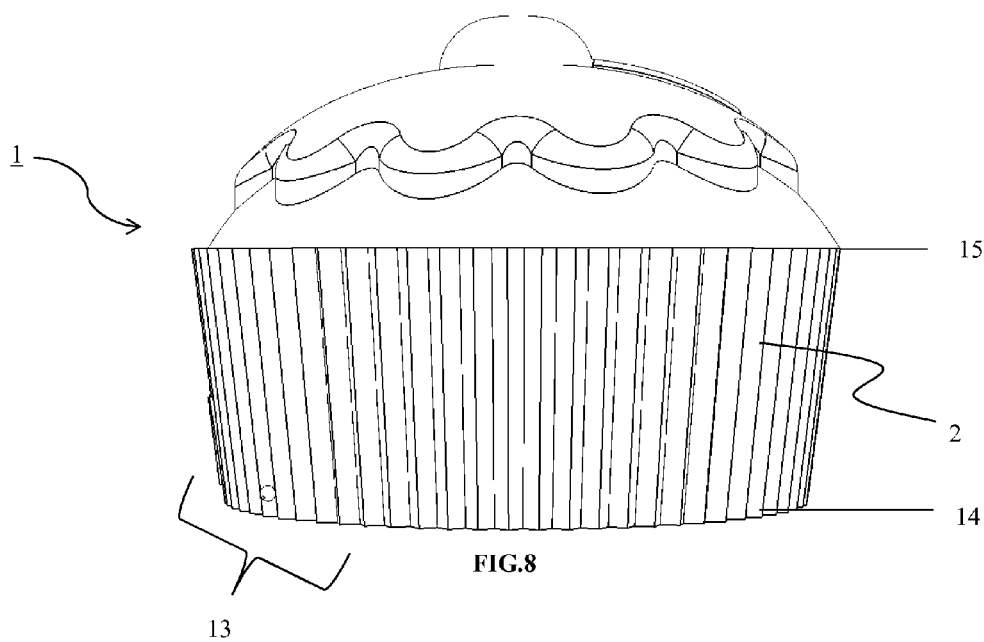
FIG. 8 is a right-side plan view of the slicing apparatus.

FIG. 7 is a back pan view of the slicing apparatus and FIG. 8 is a right-side pan view of the slicing apparatus as described above with the housing 2, its bottom 14 and its top, and in FIG. 8, the side of the button 3 as it products to a limited extent away from the housing 2. Note that in other embodiments, the button 3 may sit flush with the perimeter walls 13 of the housing 2 or may conversely be recessed into the perimeter walls 13 depending on design need and preference.

Figure 9:
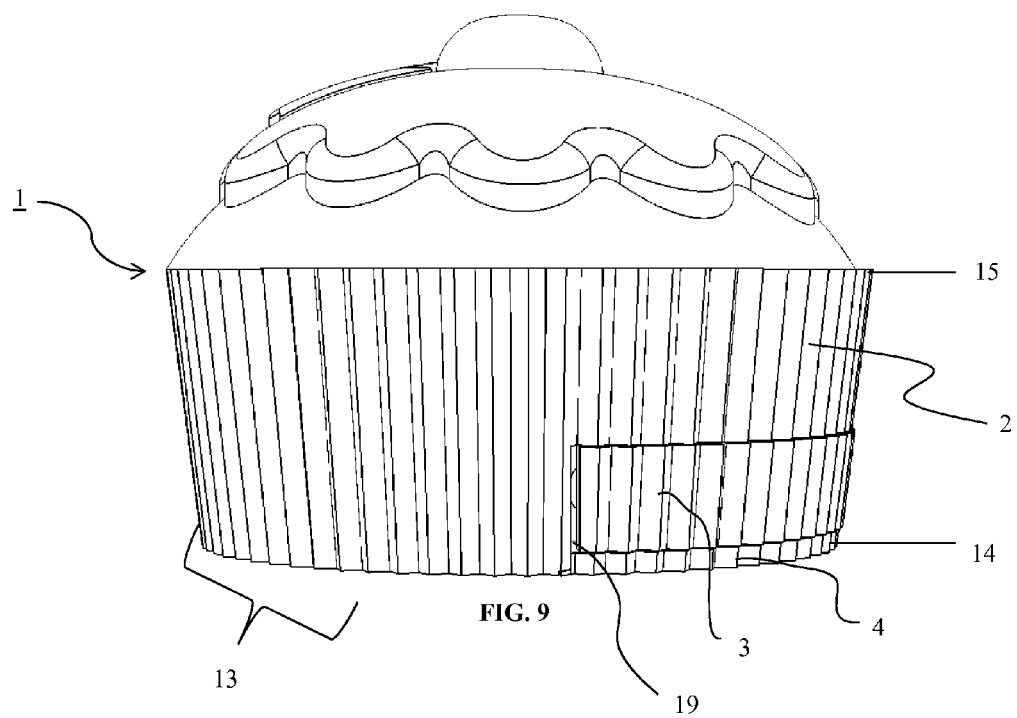
FIG. 9 is a left-side plan view of the slicing apparatus showing the button and bottom cover attached to the housing.

Turning to FIG. 9, this figure depicts a left-side pan view of one embodiment of the slicing apparatus 1 showing the button 3 attached to the housing 2. The bottom cover 4 is underneath the button 3 and is also mechanically connected to the housing 2. The housing has a top 15 and a bottom 14 wherein the bottom cover 4 in this figure is mechanically attached to the housing 2 to the extent that bottom cover 4 sits flush with the bottom cover 4 of the housing 2. However, the bottom cover 4 could alternatively protrude or be recessed into the opening of the bottom 14 of the housing 2. Similar to FIG. 8, the button 3 is shown slightly protruding away from the housing 2 (i.e. not flush).

Figure 10:
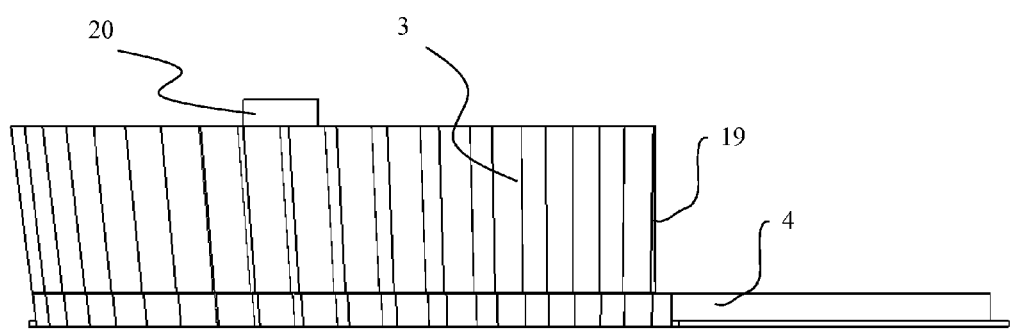
FIG. 10 is a front plan view of only the button and the bottom cover.
Figure 11:
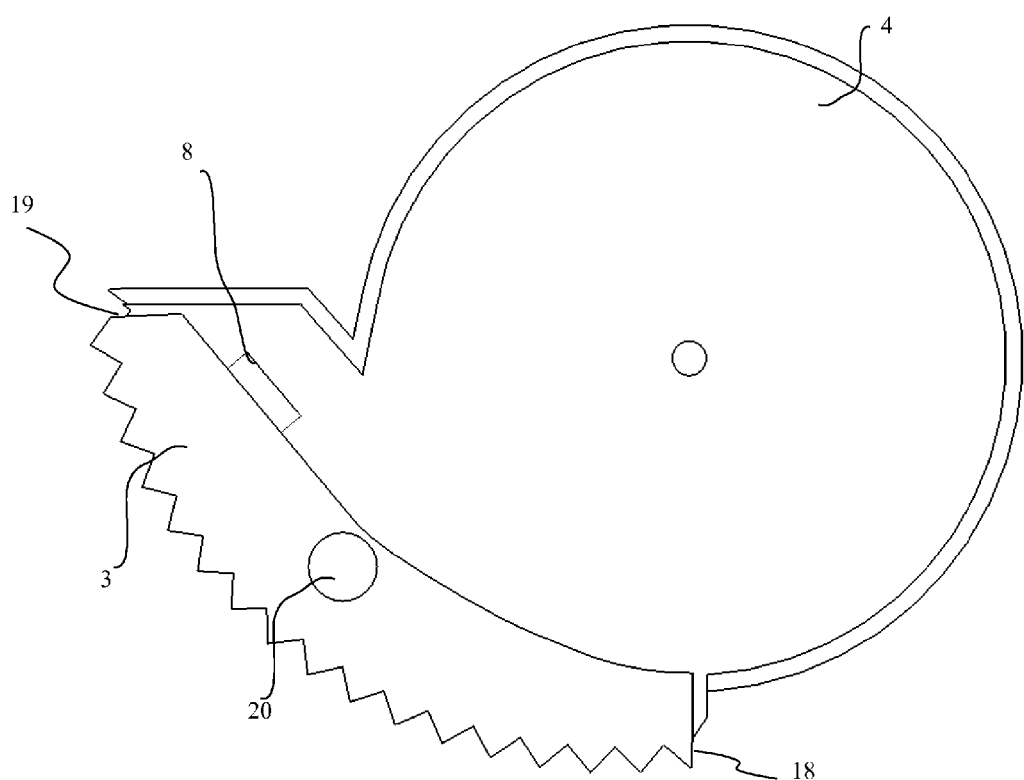
FIG. 11 is a top plan view of only the button and the bottom cover.

FIGS. 10 and 11 are particularly important as they depict how in certain embodiments the button 3 mechanically attaches to the bottom cover 4 when they are each attached to the housing 2 (the housing 2 and other elements are not shown). Accordingly, FIG. 10 is a front plan view of the slicing apparatus 1 and FIG. 11 is a top plan view of the slicing apparatus 1, each without the housing 2. The upper alignment member 20 is situated on the upper surface of the button 3 so that when the button 3 is assembled with the housing 2, the upper alignment member 20 can be inserted into the upper alignment aperture 21 of the housing 2. Similarly, though not depicted in FIGS. 10 and 11, the lower alignment member 22 is disposed on the lower surface of the button 3 in such a way that enables the button 3 to mechanically connect to the bottom cover 4 at its lower alignment aperture. This ensures that the button 3, the bottom cover 4, and the housing 2 are each mechanically connected as well as providing the allowable functionality between the filament edge 19 and the perimeter walls 13. Meaning, the mechanical attachments are configured in order to allow the at least one filament 10 to pass between the button 3 and the perimeter walls 13 to clean the at least one filament 10 as it passes through the button and housing cleaning seals 8,7 but, not provide too large a gap that the second end of the at least one filament 10 travels internal to the housing 2.

Figure 12C:
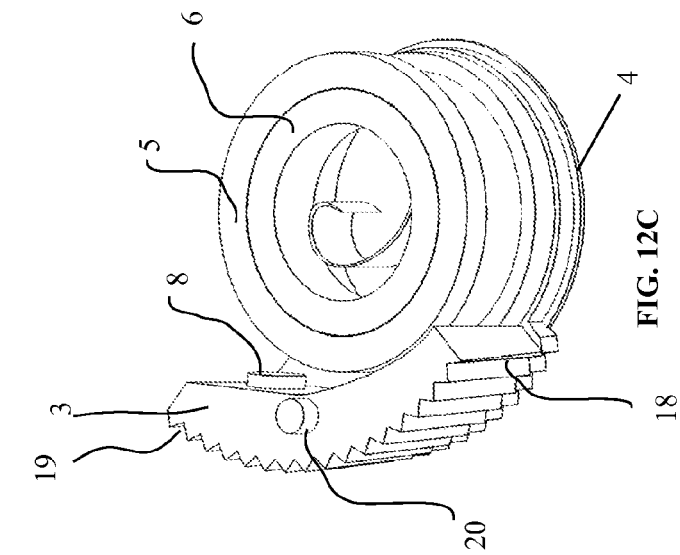
FIG. 12C is a perspective view of the bottom cover, the button, the spring housing, and the spring assembled to each other.
Figure 12B:
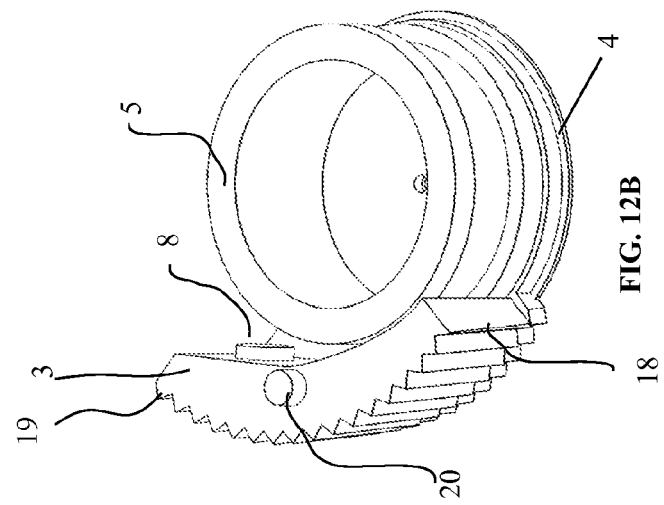
FIG. 12B is a perspective view of the bottom cover, the button, and the spring housing assembled to each other.
Figure 12A:
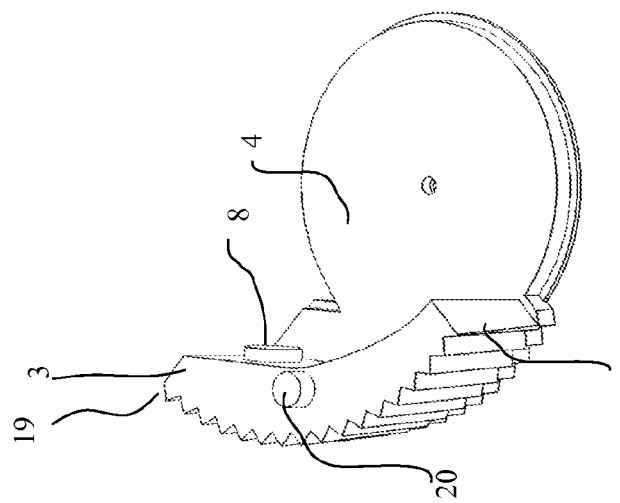
FIG. 12A is a perspective view of the bottom cover and the button assembled to each other.

Turning to FIGS. 12A-12C, these are a series of perspective views of the bottom cover assembled with the button, the spring housing, and spring (i.e. spring element) for purposes of depicting how the parts interrelate. Specifically. FIG. 12A is a perspective view of the bottom cover 4 and the button 3 mechanically attached to each other. The button 3 is situated above the bottom cover 4 and is mechanically attached to the bottom cover 4 via the lower alignment member 22 at the lower alignment aperture (underneath and thus not depicted). FIG. 12B shows the addition of the spring housing 5 to the embodiment. The spring housing 5 is circular but in other embodiment it could be different shapes including, but not limited to, rectangular or polygonal form factors. The spring housing 5 is designed to enclose a spring 6 with potential energy (as seen in FIG. 12C). However, if the spring 6 were replaced with any equivalent (i.e. an elastic band as described above), the spring housing 5 could be re-shaped to enclose said equivalent so that it still mechanically attached to the vertical member 9 and transferred resistance forces to the at least one filament 10 in response to a user's pull force.

Figure 13A:
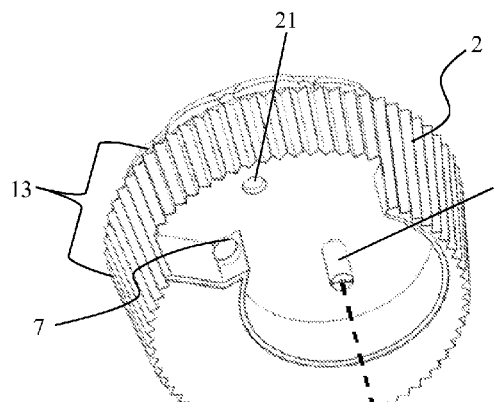
FIG. 13A is a lower perspective view of the slicing apparatus without the bottom cover.
Figure 13B:
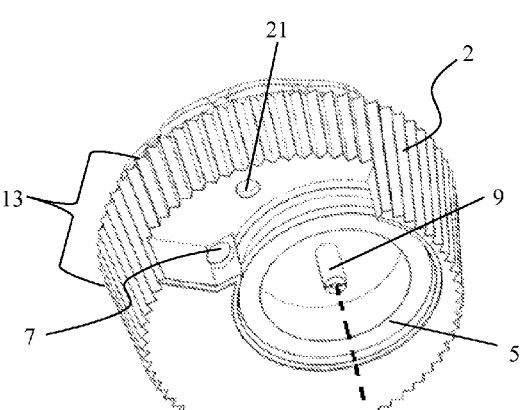
FIG. 13B is a lower perspective view of the slicing apparatus without the bottom cover but with the spring housing assembled therein.
Figure 13D:
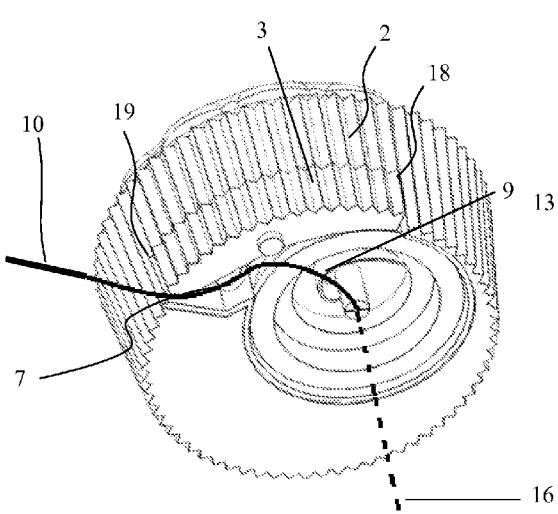
FIG. 13D is a lower perspective view of the slicing apparatus without the bottom cover but with the spring housing, the spring, and the button assembled therein.
Figure 13C:
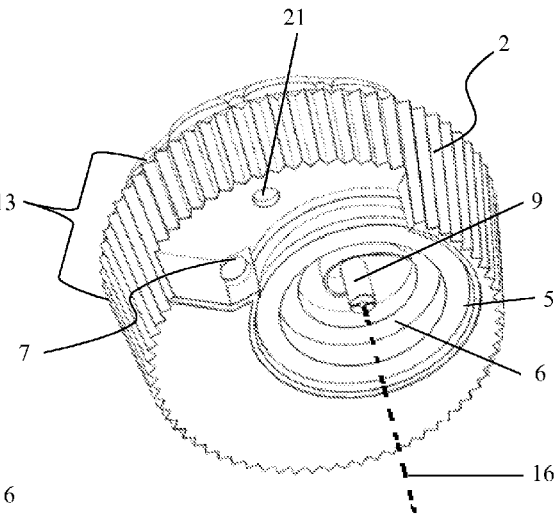
FIG. 13C is a lower perspective view of the slicing apparatus without the bottom cover but with the spring housing and the spring assembled therein

Moving to FIGS. 13A-D, these show a lower perspective view of the slicing apparatus 1 without the bottom cover 4, then with the spring housing 5 assembled therein, then the slicing apparatus 1 with the spring 6 assembled internal to the spring housing 5, and finally the button 3. Note that in each of FIGS. 13A-D, the bottom cover is not depicted intentionally to show more clearly how the elements of this embodiment tend to function with each other. In FIG. 13A, the upper alignment aperture 21 is shown disposed in the opening of the bottom 14 of the housing 2. In FIG. 13B, the spring housing 5 has mechanically attached to the vertical member 9 and is capable at this point of receiving the spring 6 or any equivalent thereof. In FIG. 13C the spring 6 with potential energy is enclosed within the spring housing 5 and has attached to the vertical member 9 so as to transfer its potential energy on the vertical member 9 to the at least one filament 10. Note that FIG. 13C clearly shows how the spring 6 interconnects with the vertical member 9 in such a way that makes it more difficult to twist the vertical member 9 away opposite the natural rotational tendency of the spring 6.

As such, when the at least one filament 10 (not depicted in 13C) mechanically connects to the vertical member 9, the potential energy of the spring 5 (or equivalent) has the tendency to cause the at least one filament 10 to be pulled towards the vertical member 9. This serves as a release mechanism if the user desires to release the at least one filament 10 after slicing. It also serves to support the compact nature of the device by providing an automatic means to store and clean the at least one filament 10 after each use since the at least one filament 10 is caused to pass between the seals (7,8) (i.e. be cleaned) and then be stored in the housing 2. Note that both the cleaning and the storing are done automatically thereby relieving the user of having to clean and/or store the device after each slice or use.

It is contemplated that the at least one filament 10 of the slicing apparatus 1 can have a retracted position and an extended position. The at least one filament 10 is understood to be in the retracted position when the second end 12 of the at least one filament 10 is nested against the perimeter walls 13 of the housing and the remainder of the at least one filament 10 is situated internal to the housing 2. In the retracted position, the at least one filament 10 is ready to be pulled and effect slices. Conversely, the at least one filament 10 is understood to be in the extended position when the second end 12 of the at least one filament 10 is extended external to the housing 2 enough to slice a volume of matter. Accordingly, the extended position can range depending on what is being sliced (i.e. anything between a mini-cupcake to a large piece of industrial foam).

Moving between FIGS. 13C and 13D also aids in seeing one embodiment of the cleaning mechanism that forms between the housing cleaning seal 7 and the button cleaning seal 8. Once the button 3 mechanically attaches to the housing through the upper alignment aperture 21, FIG. 13D shows how each seal creates a buffer between the button 3 and the housing 2. However, it also leaves a gap that is sized to permit passage of the at least one filament 10 with the exception of the thicker, second end 12. FIG. 13D also serves to depict how the at least one filament 10 mechanically connects to the vertical member 9, passes between the cleaning seals (7,8), and terminates external to the housing 2. It can be shown that the at least one filament 10 is movable in multiple directions without much restriction and is rotatable about the longitudinal axis 16 of the vertical member 9. However, the at least one filament 10 may also be rotatable with respect to the filament edge 19 on the button 3 in other embodiments.

What is important is that a user has the freedom to maneuver the cutting filament 10 vertically, horizontally, or any number of multiple planes so as to effect precise, efficient, and unique layers into a volume of matter such as cake. FIG. 13D demonstrates this as the portion of the at least one filament 10 external to the housing 2 can effect slices in multiple planes of a sliceable volume that is external to the housing 2.

Further, such slices can be effected without having to move the sliceable volume of matter since the at least one filament 10 can be retracted into the housing 2 due to the forces provided by the spring 5. In line with this, it can be seen that the passageway between the filament edge 19 and the perimeter walls 13 serve as a guide for the at least one filament 10 as it 10 is being pulled into the housing 2 by the spring 5. Further, FIG. 13D depicts the nature of how the at least one filament 10 can be received into the spring housing 6 and stored therein. This depicts the notable advantage of the slicing apparatus as to its compactness and mobility.

FIG. 14 is a perspective view of the slicing apparatus 1 with hatched lines disclaiming the non-functional features depicted therein. Similarly. FIG. 15 is a top plan view of the slicing apparatus 1 with hatched lines in order to disclaim non-functional features depicted therein. This is because in other embodiments, those features depicted by hashed lines could be replaced with other aesthetic features without necessarily affecting the functionality of the slicing apparatus 1 (i.e. instead of cupcake icing, the hashed lines could be the top of a muffin).

It is to be understood that slicing apparatus 1 may have a wide variety of shapes and sizes. For example, the housing 2 may not necessarily be round and instead can be of a rectangular, triangular, or even polygonal form factor. The dimensions may vary widely from only 1-2 inches in length and/or height to several feet in length and/or height or any size in between. Specifically, it bears mentioning that the scale and shape demonstrated in the figures herein are demonstrable of the general concept and should in no way be taken as limiting.

Any cutting filaments incorporated into the slicing apparatus 1 could be made from a single or plurality of extruded polymeric material, polyester yarn, silicone, nylon, Teflon, polyethylene or even silk.

It will be understood that many additional changes in the details, materials, steps and arrangement of parts, which have been herein described and illustrated to explain the nature of the invention may be made by those skilled in the art within the principle and scope of the concept expressed in the appended claims.

What is claimed is:

1. A slicing apparatus, comprising:
   at least one filament with a first end and a second end, wherein the at least one filament is configured to be pulled by a user;
   a housing defined by perimeter walls, comprising
   a bottom with an opening;
   a top; and
   a vertical member with a longitudinal axis, wherein the vertical member extends from the top of the housing towards the bottom;
   wherein the first end of the at least one filament is mechanically connected to the vertical member;
   wherein the at least one filament extends through the perimeter walls and the second end of the at least one filament terminates external to the housing; and
   wherein the at least one filament is rotatable with respect to the longitudinal axis of the vertical member;
   wherein the housing is bored out;
   wherein the bottom of the housing further comprises an upper alignment aperture disposed on the bottom of the housing, wherein the apparatus further comprises:
   a button comprising a filament edge, a hinge edge, an upper alignment member and a lower alignment member, wherein the upper alignment member is configured to mate with the upper alignment aperture of the housing, and wherein the button hingedly connects to the housing at the opening along its hinge edge; and
   a bottom cover configured to close the opening of the bottom of the housing, wherein the bottom cover comprises a lower alignment aperture, and wherein the lower alignment member of the button is configured to mate with the lower alignment aperture of the bottom cover;
   wherein the second end of the at least one filament passes between the perimeter walls of the housing and the filament edge of the button.

2. The apparatus according to claim 1, further comprising a release mechanism with potential energy disposed on the vertical member and a cleaning mechanism disposed on the perimeter walls, wherein the potential energy of the release mechanism pulls the at least one filament through a plurality of seals disposed on the perimeter walls into the housing whereby any residual matter that adhered to the at least one filament while external to the housing can be removed by sliding through the plurality of seals.

3. The apparatus according to claim 1, further comprising a spring element with potential energy disposed in the housing, wherein the spring element mechanically connects to the vertical member, and wherein when the second end of the at least one filament is pulled away from the housing, the potential energy of the spring element provides a force drawing the at least one filament towards the vertical member.

4. The apparatus according to claim 3, wherein the housing further comprises a housing seal adjacent to the filament edge of the button and the button further comprises a button seal disposed on the button adjacent to the housing seal, wherein when the spring element draws the at least one filament into the housing, the at least one filament passes between the housing seal and the button seal, whereby any residual matter that adhered to the at least one filament while external to the housing can be removed by the housing seal and the button seal.

* * * * *